(12) United States Patent  
Mahalek

(10) Patent No.: US 12,241,554 B2  
(45) Date of Patent: Mar. 4, 2025

(54) COMBINATION VALVE CONSISTING OF QUICK-ACTING VALVE AND CONTROL VALVE FOR A STEAM CIRCUIT AND SIL 3 CERTIFIED SAFETY CIRCUIT

(71) Applicant: TURVENTIL GMBH & CO. KG, Nuremberg (DE)

(72) Inventor: Michael Mahalek, Nuremberg (DE)

(73) Assignee: TURVENTIL GMBH & CO. KG, Nuremberg (DE)

( * ) Notice: Subject to any disclaimer, the term of this patent is extended or adjusted under 35 U.S.C. 154(b) by 343 days.

(21) Appl. No.: 17/781,610

(22) PCT Filed: Nov. 10, 2020

(86) PCT No.: PCT/EP2020/081611  
§ 371 (c)(1),  
(2) Date: Jun. 1, 2022

(87) PCT Pub. No.: WO2021/110375  
PCT Pub. Date: Jun. 10, 2021

(65) Prior Publication Data  
US 2023/0003304 A1   Jan. 5, 2023

(30) Foreign Application Priority Data  
Dec. 2, 2019   (DE) .................. 10 2019 218 694.7

(51) Int. Cl.  
*F16K 1/44* (2006.01)  
*F01D 17/14* (2006.01)  
(Continued)

(52) U.S. Cl.  
CPC ............ *F16K 1/443* (2013.01); *F01D 17/145* (2013.01); *F01D 21/14* (2013.01); *F01K 13/02* (2013.01);  
(Continued)

(58) Field of Classification Search  
CPC .......... F16K 1/443; F16K 1/44; F16K 38/024; F01D 17/145; F01D 17/18  
See application file for complete search history.

(56) References Cited

U.S. PATENT DOCUMENTS 3,529,630 A  *  9/1970  Podolsky .................. F16K 1/44  
                                              137/630.14  
4,114,651 A       9/1978  Oberle  
(Continued)

FOREIGN PATENT DOCUMENTS

CH          583371 A5     12/1976  
DE         2710527 A1      9/1978  
(Continued)

OTHER PUBLICATIONS

Traupel, "Regulation of the Steam Turbines," Chapter 12, Thermal Turbo Machinery, Dec. 22, 1981, ISBN 978-3-642-96633-0, Springer-Verlag, 1982, pp. 49-97, Berlin, Germany.  
(Continued)

*Primary Examiner* — Reinaldo Sanchez-Medina  
(74) *Attorney, Agent, or Firm* — Workman Nydegger

(57) ABSTRACT

A combination valve for a steam circuit, includes a quick-closing valve and a regulating valve. The quick-closing valve and the regulating valve are arranged in a common housing. The regulating valve is displaceable by an active drive and the quick-closing valve is passively displaceable by the steam.

21 Claims, 7 Drawing Sheets

(51) Int. Cl.
  *F01D 21/14* (2006.01)
  *F01K 13/02* (2006.01)
  *F16K 1/52* (2006.01)
  *F16K 31/56* (2006.01)

(52) U.S. Cl.
  CPC ................ *F16K 1/52* (2013.01); *F16K 31/56* (2013.01); *F05D 2220/31* (2013.01); *F05D 2270/56* (2013.01)

(56) References Cited

U.S. PATENT DOCUMENTS

| | | | | |
|---|---|---|---|---|
| 5,971,018 | A * | 10/1999 | Karlsson | F16K 31/363 137/613 |
| 9,279,345 | B2 * | 3/2016 | Chowdhury | F01D 17/145 |
| 10,480,346 | B2 | 11/2019 | Leykauf | |
| 10,591,084 | B2 * | 3/2020 | Futahashi | F16K 31/16 |
| 11,384,863 | B2 * | 7/2022 | Hasegawa | F16K 31/1226 |
| 2012/0137688 | A1 | 6/2012 | Batwal et al. | |
| 2018/0252320 | A1 * | 9/2018 | Futahashi | F16K 47/02 |
| 2018/0340627 | A1 | 11/2018 | Futahashi et al. | |

FOREIGN PATENT DOCUMENTS

| | | |
|---|---|---|
| DE | 2948639 A1 | 6/1981 |
| WO | 2010105897 A1 | 9/2010 |

OTHER PUBLICATIONS

International Search Report from corresponding PCT Application No. PCT/EP2020/081611, Feb. 8, 2021.
German Search Report from corresponding DE Application No. 10 2019 218 694.7, Jul. 1, 2020.

* cited by examiner

COMBINATION VALVE CONSISTING OF QUICK-ACTING VALVE AND CONTROL VALVE FOR A STEAM CIRCUIT AND SIL 3 CERTIFIED SAFETY CIRCUIT

BACKGROUND

The invention relates to a combination valve of quick-closing valve and regulating valve for a steam circuit, in particular a steam circuit of a steam turbine.

For a safe operation of steam turbines, between the boiler and the steam turbine there is employed a usually hydraulic quick-closing valve with pre-stroke as a main shut-off valve, which closes in fractions of a second and is always fully open during operation and is only closed when the machine is deliberately shut down or in the event of a malfunction, such as load shedding and simultaneous failure of the regulation system. As a regulating valve, a throttle valve is employed which regulates the entrance pressure and steam quantity to the specified steam pressures and steam quantities before the blading of the steam turbine. The most commonly used regulating valves are non-pressure-relieved single-seat valves which are operated with high-pressure oil systems of 100-160 bars because of their high valve forces. For very large steam volumes, very massive and voluminous valves are employed, which are likewise operated with high-pressure oil systems or with medium-pressure oil systems of 30-50 bars.

For increasing the efficiency, it is usual to feed the steam to the turbine via several exposure sectors, usually between 2 and 6 up to a maximum of 10 sectors. The steam inflow to each sector is adjusted by its own regulating valve. As the load increases, one regulating valve after the other is opened in a steady manner, so that in any arbitrary load condition, some regulating valves are fully opened and only one is partially opened. Throttling losses therefore only occur at this one partially opened regulating valve, resulting in a favourable overall efficiency.

It is known to combine the quick-closing valve and the regulating valve as a combination valve in one common valve housing. In practice, each of the two valves has its own active drive. Such combination valves have the problem of a valve structure extending over several meters, as the drives for the respective valve stem have to be arranged on different sides of the housing. In addition, pressure losses, high valve forces and in particular vibrations at the valve stem as well as leaking valve seals are often a problem during operation. Thus, vibrations at valve stems lead to damage at the stems, valve seats and valve guides. This results in steam leakage, which makes additional suctions necessary. Furthermore, pressure losses may occur due to multiple deflection of the steam in the housing.

SUMMARY

It is the object of the present invention to provide a combination valve for a steam circuit, in particular for a steam circuit of a steam turbine, which enables a compact and space-saving arrangement and a favourable fluid-mechanical design.

This object is achieved by a combination valve having the features stated in claim 1. In claims dependent thereon, advantageous embodiments and developments of the combination valve are stated.

Accordingly, the combination valve comprises a quick-closing valve and a regulating valve which are arranged in a common housing, only the regulating valve being displaceable by an active drive. The quick-closing valve, however, is passively displaceable by steam from the steam circuit, in particular main steam.

It has been found that this offers advantages regarding the size of the combination valve. By such a way of driving the two valve components, only one active drive is required for the regulating valve. An active drive for the quick-closing valve is unnecessary. The combination valve can therefore be embodied with a small footprint.

The steam-controlled quick-closing valve can be displaced in a simple manner by the steam being present at suitable control areas of the quick-closing valve body via corresponding pressure differences. For this purpose, the quick-closing valve preferably has control areas on its front side, which enables the quick-closing valve to be opened, as well as control areas on its back side, which contribute to the closing of the quick-closing valve.

In this regard, the steam-controlled quick-closing valve is preferably configured such that, when the quick-closing valve is open, the steam pressure is present only at the front-side control areas, while the back-side control areas are pressure less. For closing the quick-closing valve, steam pressure is applied to both sides of the control areas. Since the front-side and back-side control areas offer approximately equally sized working areas for the steam pressure, an additional, preferably mechanical, closing component, for example a spring, is installed for the closing operation of the quick-closing valve, which closing component additionally acts on the back-side control areas when the quick-closing valve closes, in order to enable the closing operation of the quick-closing valve. Moreover, in the absence of steam pressure, the mechanical closing component can keep the quick-closing valve closed.

The mechanical closing component is preferably selected such that it does not hinder an opening of the quick-closing valve when a sufficiently high steam pressure is present at the front-side control areas and the back-side control areas are pressure less. The closing force of the closing component is coordinated such that it is smaller than the force at the closed quick-closing valve's front control areas which are exposed to steam pressure. The closing force of the mechanical closing component is less than 75%, in particular less than 50%, in particular less than 25%, in particular less than 10%, in particular less than 5%, in particular less than 1%, of the force of the steam pressure being present.

The combination valve has in particular a control component which enables the steam to be selectively directed to the at least one rear control area of the quick-closing valve. Such control components, for example valves, are significantly smaller than an active drive and can be arranged on the side or above the valve housing. The active drive of the regulating valve is preferably attached to exactly one side of the housing.

This compactness of the combination valve allows a simple and space-saving arrangement of the combination valve in the steam circuit. Furthermore, space can be saved because the combination valve itself is built small.

The sealing of the valve stems against the atmosphere is advantageously solved in this combination valve by the quick-closing valve not having a stem but only the regulating valve having a stem directed outwards and the back-side control areas of the quick-closing valve are pressureless in the open position of the quick-closing valve. Thus, the stem seal of the regulating valve, which seals the stem against the atmosphere on one side, can also be kept pressureless on the other side during operation. Only when the steam pressure to the turbine is switched on, the stem seal of the regulating valve is briefly under static pressure, but only until the opening operation of the quick-closing valve is initiated.

Preferably, the quick-closing valve is configured with a sleeve-shaped quick-closing valve body. On the one hand, a sleeve-shaped valve body enables the valve to be shut off safely. On the other hand, such an embodiment has a uniform front-side working area for the steam. The back side of the sleeve-shaped quick-closing valve body is preferably designed as a circular area. In addition, the sleeve-shaped embodiment of the quick-closing valve body allows the possible arrangement of further components in the internal space of the quick-closing valve body.

Thus, advantageously, the regulating valve can be configured with a tubular valve body and the tubular valve body of the regulating valve can be guided on the inside of the sleeve-shaped quick-closing valve body. This allows the regulating valve to be arranged, at least partly, in the internal space of the quick-closing valve. This means that the two valve bodies together require only slightly more space than one single valve body. Furthermore, the fact that the two movable valve bodies move in the same direction away from the respective valve seat allows the steam to flow in and out freely with low flow losses.

Preferably, the regulating valve is embodied as a "pressure-relieved tubular regulating valve". This enables a pressure-relieved actuation of the regulating valve. The tubular valve body is a tube section, it has two annular sealing areas and preferably has an inner wall to which the stem shaft, which is in connection with the drive of the regulating valve, is fastened. In addition, the inner wall preferably has bores for the pressure relief of the regulating valve. Due to the bores, only minimal pressure needs to be counteracted upon the travel of the regulating valve.

Alternatively, the regulating valve is embodied as a "pre-stroke regulating valve" in which the pre-stroke on the regulating valve is opened first and then the valve body.

Just as the tubular valve body of the regulating valve can advantageously be guided on the inside of the sleeve-shaped quick-closing valve body, the sleeve-shaped valve body of the quick-closing valve can in turn advantageously be guided on the outside in a guide sleeve. The guide sleeve can be a separate element in the housing, or the housing itself can be configured on the inside as a guide sleeve for the sleeve-shaped valve body of the quick-closing valve.

Preferably, the combination valve allows independent switching and also closing of the two components regulating valve and quick-closing valve in the sense of two independent redundant closing elements. For example, the regulating valve can initially remain closed and the quick-closing valve can be opened. Then, the regulating valve can be opened as required to enable a passage of the steam. This also enables good regulatability of minimal steam flows.

The preferred embodiment of the combination valve with two independent redundant closing elements also makes it possible to stop the steam supply quickly and safely. For example, the steam supply through the combination valve to a steam turbine must be completely shut off within approx. 0.3 seconds in order to ensure protection of the turbine. Since both valves achieve these closing times, it is sufficient that one of the two valves closes the steam flow leakage-free. Preferably, both valves close leakage-free. In particular, the quick-closing valve closes leakage-free. The regulating valve may have a leakage flow, but the leakage flow of the regulating valve is preferably negligible low. In particular, in the event that the steam is supplied to the turbine via several exposure sectors and accordingly several combination valves are provided, the leakage flow of the regulating valve is unproblematic, since this always only directly affects the first/next opening valve in the combination valve row, in particular the regulating valve. The other valves, in particular the quick-closing valve, are first closed anyway and thus leakage-free. Compared to the prior art, the combination valve has the advantage that multiple leakage flows do not add up. This is reliably prevented with the present combination valve.

Further preferably, a switchable control valve is provided for switching the quick-closing valve. For this purpose, in particular a 3/2 way valve is used. The switchable control valve serves for directing the steam to the back side of the quick-closing valve body via a line system. Such a valve has the necessary switching times to close the quick-closing valve in approx. 0.3 seconds. A switchable control valve can, moreover, be configured with relatively small and inexpensive drives.

Preferably, the control valve has a hydraulically or pneumatically embodied control drive. This enables a targeted switching of the combination valve by the control drive used. The preferred drive mechanisms of the control drive here are selected such that they do not require complex drives but can be embodied relatively small compared to the combination valve. This allows the valve including the control drive to be arranged on the side of or above the combination valve. The hydraulics or pneumatics are usually already present in the application area of such a combination valve and can be directly utilized.

The regulating valve can advantageously have a regulating valve drive embodied as a low-pressure hydraulic drive or as an electric drive. This allows targeted control of the regulating valve. In addition, the preferred drive mechanisms are simple to execute. The preferred design of the regulating valve as a pressure-relieved tubular regulating valve allows the use of low-pressure hydraulics in the range of 2 to 18 bar, in particular 4 to 16 bar, in particular 6 to 14 bar, in particular 8 to 12 bar instead of the usual high-pressure hydraulics of 60 to 200 bar for non-relieved valves, or an electric drive. The electric drive can be embodied relatively small for a pressure-relieved regulating valve, as only a small torque is required.

Advantageously, the housing of the combination valve is constructed from a housing base body and a housing cover, the housing base body being connectable to the housing cover in a force-fitting and/or form-fitting manner. This enables an uncomplicated mounting of the components and also enables a relatively uncomplicated replacement of the installed components. The housing cover here is preferably connected to the housing base body by screws. The housing cover preferably comprises exactly one side wall of the housing.

The drives of the quick-closing valve and of the regulating valve as well as the quick-closing valve itself and the regulating valve itself are preferably fastened to or guided on the housing cover. This allows easy removal of the valves and their drives by taking off the cover, making it easy to replace the components in a more suitable location, such as a workshop.

Preferably, the drives can also be removed individually when the cover is mounted. This enables an easy and quick replacement of defective drives.

If a component is defective, the complete cover including the valve mechanisms can be replaced without requiring disassembly of the tube connection. Replacing the components by replacing the entire housing cover enables the realization of short downtimes of the combination valve.

The defective housing cover can then be repaired or replaced, while the steam circuit can be further operated with the replaced cover.

The housing preferably has a steam strainer at a steam entry port, which comprises a steam deflector. This allows a partial deflection of the entering steam flow. With this type of valve, the steam flow must be directed through a 90° angle, which can lead to flow losses. Due to the steam strainer used, the entering steam is already deflected at the steam entry port by an angle of 10° to 80°, in particular 25° to 65°, in particular 30° to 55°, in particular 40° to 50°, in particular 45°. This partial deflection reduces the flow losses occurring in the valve by gradually deflecting the steam.

The steam strainer also enables foreign matter entrained in the steam flow to be filtered out. The foreign matter comprises, for example, welding beads or detachments from the boiler and tubing. By filtering out the entrained foreign matter, damage to the valve bodies, valve areas and turbine blades due to impact of the foreign matter is prevented. Damage to the valve bodies and the valve areas can lead to unwanted leakage flows. Damage to turbine blades can lead to a reduction in the efficiency of the turbine, although this does not necessarily result in the turbine being shut down. In extreme cases, this can lead to blade breakage, additional damage to internal parts of the turbine and even damage to the turbine housing, which can cause the turbine to come to a standstill and usually make subsequent repairs unavoidable.

The steam strainer is connected to the housing cover of the housing preferably in a detachable manner. This allows easy cleaning and replacement of the steam strainer. The steam strainer can be removed by taking off the cover together with it. The connection between steam strainer and cover, preferably embodied as a pin connection, can be detached and the steam strainer can be checked, cleaned and/or replaced. This allows easy and quick replacement of the steam strainer in case of damage or heavy soiling. Damage to the steam strainer can be caused by foreign matter entrained in the steam flow or by vibrations caused by the steam flow.

Furthermore, the steam strainer can preferably rest in a fitting guide of the housing base body in the mounted state for stabilization in order to minimize the mechanical load on the steam strainer, for example due to vibrations caused by the steam. The guides in the housing base body are preferably designed in such a way that the steam strainer is not damaged by a slight vibration in the guides. For this purpose, the guides preferably have an insert made of a soft and thus damping material.

The housing also advantageously has a diffuser at a steam exhaust port. This enables a further reduction of flow losses in the combination valve. The diffuser here advantageously serves as a sealing area for both the quick-closing valve and the regulating valve. The sealing area for the quick-closing valve is radially on the outside relative to the sealing area for the regulating valve.

Preferably, the diffuser has a swirl-breaking device that acts as a deflecting device for the steam flow and resolves turbulences in the steam flow. The swirl-breaking device here is made of two to twelve, in particular four to eight, in particular five to seven, in particular six swirl-breaking teeth. The swirl-breaking teeth are located at the entrance side of the diffuser and extend into the internal space of the flow channel. In this way, they can prevent or dissolve turbulences in the steam flow.

Particularly preferably, the swirl-breaking teeth of the swirl-breaking device are located between the sealing seat of the quick-closing valve and the sealing seat of the regulating valve. Thus, the swirl-breaking device can form a guide for the regulating valve. This means that in the end area of the stroke of the regulating valve, shortly before the regulating valve reaches the sealing seat at the diffuser, the guide of the swirl-breaking device engages. Preferably, the guide of the swirl breaker engages approximately up to the first third of the stroke when the regulating valve leaves the sealing seat on the diffuser, and similarly when closing, before the regulating valve reaches the sealing seat in the last third. This allows the vibrations at the regulating valve in this area to be reduced to a minimum. These vibrations are strongest when the regulating valve is opened.

The diffuser is arranged in the housing base body advantageously in a detachable manner. This allows an easy change of the diffuser in case of maintenance of the valve or damage to the diffuser, for example on the sealing areas. The diffuser here can, for example, be screwed into the housing base body or inserted and fastened by means of a pin or screw connection.

As already mentioned, the diffuser serves as a sealing area for the regulating valve and for the quick-closing valve. As these areas can be damaged by the fast-closing processes, easy replacement of the diffuser is useful and can thus minimize maintenance effort.

Here, for an easier and better check for wear and/or damage, the diffuser can be checked outside the housing. On the one hand, a check in the disassembled state allows an improved visual check of all areas of the diffuser. On the other hand, a check in the disassembled state allows the diffuser to be checked with different checking means, such as for example various types of radiographic check or surface check.

It often happens that a steam circuit runs for months or years without the need to close the quick-closing valve. It is therefore of particular importance for a steam circuit to prove that the quick-closing valve actually moves when it is suddenly needed and is not stuck. Corresponding tests are carried out during ongoing operation and must not interfere with the operation. This is not difficult in systems that have two redundant quick-closing valves arranged in parallel, because then each quick-closing valve can be closed individually for test purposes while the other is open and guarantees steam flow. However, if only one quick-closing valve is provided, for example because the redundancy is ensured by the regulating valve as in the present combination valve, so-called partial stroke tests are carried out on the quick-closing valve, which are characterized by the fact that the quick-closing valve is only moved over part of its stroke without this influencing the ongoing, adapted and reduced operation of the steam circuit. The American API 612 standard standardizes this test. In the present combination valve, the stroke range of the quick-closing valve in the partial stroke test is preferably 15%-20% of the full stroke.

For this purpose, the quick-closing valve is exposable to main steam via a separate shut-off line in such a way that it moves in its closing direction during ongoing operation of the steam circuit—supported, for example, by the spring force of the mechanical closing component. Due to the displacement of the quick-closing valve in the closing direction, a throttle point opens, via which the main steam can escape, so that the quick-closing valve is prevented from moving further in the closing direction and instead remains in a partial stroke position. The successful partial stroke test is checked via two pressure transmitters arranged upstream and downstream of the throttle point. The two pressure transmitters confirm when the respectively indicated pressures have levelled off to a common mean pressure somewhere between the pressure in the steam entry port and the ambient pressure.

Of course, a full stroke test is much more informative because it also provides information about the valve's capability to shut off. As the steam is usually supplied to the turbine via several exposure sectors and thus several combination valves are provided, the partial stroke test of the quick-closing valve can advantageously be replaced by a common full stroke test of the quick-closing valve and the regulating valve of the respective combination valve. For this, the turbine output in the steam circuit is first reduced by adapting it to the remaining open valves, so that the combination valves can then perform the full stroke test one after the other and thus prove their suitability for an even safer stop and shut-off of the turbine.

The combination valve disclosed herein has the particular advantage that it can be used in safety circuits certified as "SIL 3" in accordance with IEC/EN 61511/61508. "SIL" stands for "safety integrity level" and specifies the requirements as to the reliability of safety functions of electrical and/or electronic and/or programmable electronic systems in four safety levels. SIL means reducing hazards to people, the environment and property to an acceptable level. For example, a safety circuit where only one quick-closing valve is provided in a steam circuit cannot exceed SIL 2. For SIL 3, at least the redundancy of the quick-closing valve would be required, i.e. a second upstream or downstream quick-closing valve would have to be provided, for example, so that in the event of failure of one valve, at least the other valve can still close. Two shut-off valves of the same type are referred to as homogeneous redundancy. When the two shut-off valves are of different types, i.e. when a systemic fault cannot lead to the simultaneous failure of both valves, this is called diversitary redundancy. For example, a quick-closing valve which, like the present one, is steam-controlled and a regulating valve which, on the one hand, is suitable for completely shutting off the passage and, on the other hand, is actuated e.g. electrically, can together make a safety system SIL 3-capable. The present combination valve combines such a quick-closing valve and such a regulating valve in one common housing, and the fact that both valves can open and close independently of each other qualifies the combination valve as SIL 3-capable with diversitary redundancy. As a result, this combination valve, in the case of SIL 3 requirements in safety circuits, can replace the classic quick-closing valves. It offers the particular advantage that it is small in size because both valves are combined in one housing, and that it enables the partial stroke test, which is also a mandatory requirement due to the API 612 standard. Both properties in combination in one valve, plus SIL 3 capability, represent a special technical advance.

Both the features stated in the patent claims and the features indicated in the following embodiment examples of the combination valve are each suitable, alone or in combination with each other, for developing the object further. The respective feature combinations do not represent a restriction with regard to the further development of the combination valve but are substantially merely exemplary in character.

BRIEF DESCRIPTION OF THE DRAWINGS

Further embodiment examples will hereinafter be explained more closely with reference to the drawings. There are shown.

DETAILED DESCRIPTION OF VARIOUS EMBODIMENTS

Figure 1:
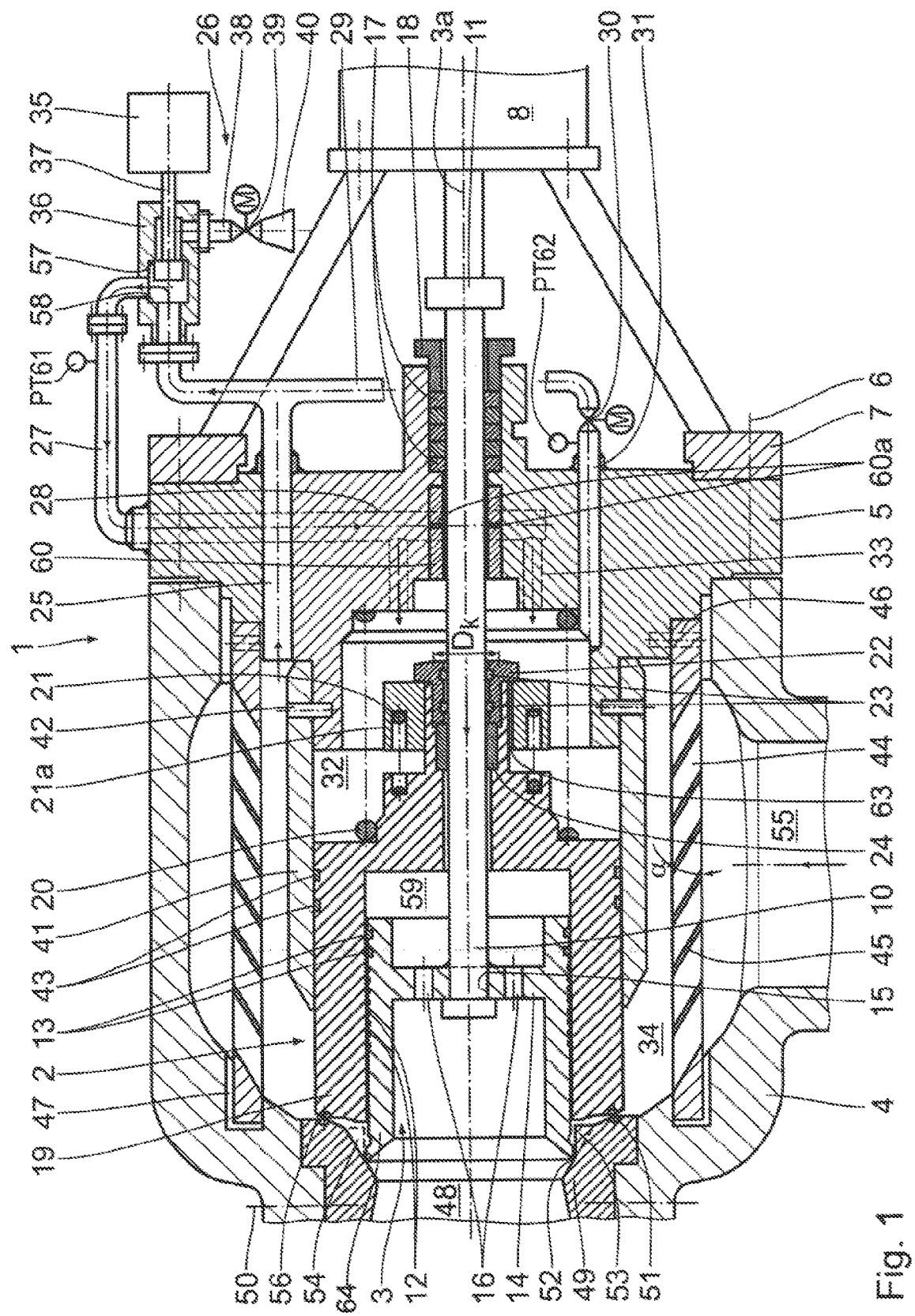
FIG. 1 a sectional representation of a first embodiment example of the combination valve with quick-closing valve and regulating valve in the closed state, FIG. 2 a sectional representation of the combination valve corresponding to FIG. 1 with quick-closing valve in the open state and regulating valve in the closed state, FIG. 3 a sectional representation of the combination valve corresponding to FIG. 1 with quick-closing valve and regulating valve in the open state, FIG. 4 a sectional representation of the combination valve corresponding to FIG. 1 with regulating valve in the open state and quick-closing valve in the partial stroke test, FIG. 5 a front view of the diffuser, FIG. 6 a sectional representation of a second embodiment example of the combination valve with quick-closing valve and regulating valve in the closed state, FIG. 7 a side view of the spring sleeve with axial groove, sitting on the stem shaft of the regulating valve, and the associated tensioner.

FIG. 1 shows a combination valve 1 with a quick-closing valve 2 and a regulating valve 3 in the closed state. The quick-closing valve 2 and the regulating valve 3 are arranged coaxially along a longitudinal axis 3a. The combination valve 1 comprises a housing base body 4 with a sleeve 60 and a housing cover 5. The sleeve 60 is inserted in the housing cover 5 and axially supported thereon. The housing base body 4 and the housing cover 5 are connected to each other with a screw connection 6. The screw connection 6, moreover, connects a valve attachment 7 and the housing cover 5 to the housing base body 4. A regulating valve drive 8 is screwed to the valve attachment 7. Alternatively, the valve attachment 7 can also be connected to the regulating valve drive 8 via a pin connection, welded to it or connected with a form-fitting connection.

The regulating valve 3 is embodied as a pressure-relieved tubular regulating valve and comprises a tubular valve body 64, a stem shaft 10 and the regulating valve drive 8. The regulating valve drive 8 is connected to the stem shaft 10 by a stem coupling 11. The tubular valve body 64 comprises a labyrinth seal 12 and sealing rings 13 on its outside. The tubular valve body 64 also comprises an inner wall 14 which has a centric stem shaft bore 15 and pressure relief bores 16 arranged circularly around the former. The number of pressure relief bores 16 is designed in such a way that they provide a sufficient pressure flow area so that the regulating valve 3 only has to counteract a minimum pressure difference when closing. Preferably, four, six or eight pressure relief bores 16 are used. A larger or smaller number of pressure relief bores 16 is possible depending on the diameter of the pressure relief bores 16.

The stem shaft 10 is guided through the stem shaft bore 15 and welded to the inner wall 14. The stem shaft 10 is guided by the stem seal 17. The stem seal 17 is arranged in the housing cover 5 and is axially fixed along the longitudinal axis 3a by a tensioner 18.

The inner diameter of the sleeve 60 is larger than the outer diameter of the stem shaft 10. An annular interstice, in particular a gap area, is formed between the stem shaft 10 and the sleeve 60 so that an equalization of pressure is possible via this.

The quick-closing valve 2 comprises a quick-closing valve body 19, a first cylindrical compression spring 20, a second cylindrical compression spring 21, a spring sleeve 21a with an axial groove 63, a bushing 24 and a tensioner 22. The bushing 24 is connected to the quick-closing valve body 19 in a form-fitting manner and serves as a guide on the stem shaft 10 of the regulating valve 3.

The tensioner 22 is screwed with self-blocking fine thread in the quick-closing valve body 19 according to a longitudinal dimension to be adjusted, whereby the tensioner 22 rests against the edge of the quick-closing valve body 19 and has a play of, for example, 0.2 mm towards the bushing 24. The tensioner 22 has a hexagon head and can additionally be secured with a pin. Moreover, the tensioner 22 is also equipped with sealing rings 23, which seal the internal space 59 against the spring chamber 32 in both directions via the movable stem shaft 10.

The quick-closing valve 2 comprises a main steam channel 25, a control valve 26, a control line 27, a chamber 28, a shut-off line 29 and a shut-off valve 30. The shut-off valve 30 is connected via a bore 31 to a spring chamber 32. The spring chamber 32 is connected to the chamber 28 via eight bores 33. The number of bores 33 is not limited to eight. The number and diameter of the bores 33 should be selected during the design such that the total area of all bores 33 corresponds to the area of the main steam channel 25.

The annular interstice between the stem shaft 10 and the sleeve 60 is connected to the chamber 28 via at least one, in particular several, radial bores 60a. Via the annular interstice and the radial bores 60a, steam pressure from the spring chamber can decrease, as soon as, upon the opening of the quick-closing valve 2, the tensioner 22 reaches the damping zone.

The steam chamber 34 is connected to the control valve 26 via the main steam channel 25. When the control valve 26 is deactivated, the main steam channel 25 is connected to the control line 27. The control line 27 ends in the chamber 28, which is connected to the spring chamber 32 via the bores 33. Consequently, when the control valve 26 is deactivated, the main steam can enter the spring chamber 32 through the main steam channel 25, the control line 27, the chamber 28 and the bores 33 and keep the quick-closing valve in the "closed" position.

The control valve 26 comprises a control drive 35 and a 3/2 way valve 36, which comprises a valve body 37 which is embodied in particular as a valve cone. Furthermore, the control valve 26 comprises a channel 38 which is connected to the leakage steam line 40 by means of a shut-off valve 39. Starting out from the activation state of the control valve 26, the control line 27 is fluidly connected to the main steam channel 25 or the channel 38.

The combination valve 1 comprises a guide sleeve 41 connected to the housing cover 5, wherein the guide sleeve 41 is connected to the housing cover by a pin connection 42. The guide sleeve 41 serves for guiding the quick-closing valve body 19. Sealing rings 43 are arranged between the guide sleeve 41 and the quick-closing valve body 19, which seal the steam chamber 34 against the spring chamber 32.

The combination valve 1 comprises a steam strainer 44 with a steam strainer deflection 45. The steam strainer 44 is connected to the housing cover 5 via a pin connection 46. Furthermore, the steam strainer 44 rests in a recess 47 in the housing base body 4.

Moreover, a diffuser 49 is arranged in the housing base body 4 at a steam exhaust port 48. The diffuser 49 is connected to the housing base body 4 via a holding pin 50.

The diffuser 49 has a first sealing area 51 and a second sealing area 52. The first sealing area 51 serves as a valve seat for the quick-closing valve. The second sealing area 52 serves as a valve seat for the regulating valve 3. Moreover, the diffuser 49 has a swirl-breaking device 53. The swirl-breaking device 53 here has six swirl-breaking teeth 54 which are evenly distributed over the circumference of the diffuser 49.

Hereinafter, the function of the combination valve 1 is explained with reference to various switching states.

In FIG. 1 the steam enters the combination valve 1 through a steam entry port 55. The steam is then present at a control edge 56 of the quick-closing valve 2. In addition, the steam guided through the main steam channel 25, the control line 27, the chamber 28 and the bore 33 is present at the back side of the quick-closing valve body 19. Since the back side of the quick-closing valve body 19 has a larger control area than the control edge 56, the quick-closing valve 2 remains closed due to the resulting force difference.

The regulating valve 3 is in the closed state. The steam is prevented from entering the steam exhaust port 48 by the first sealing area 51 and the second sealing area 52.

Figure 2:
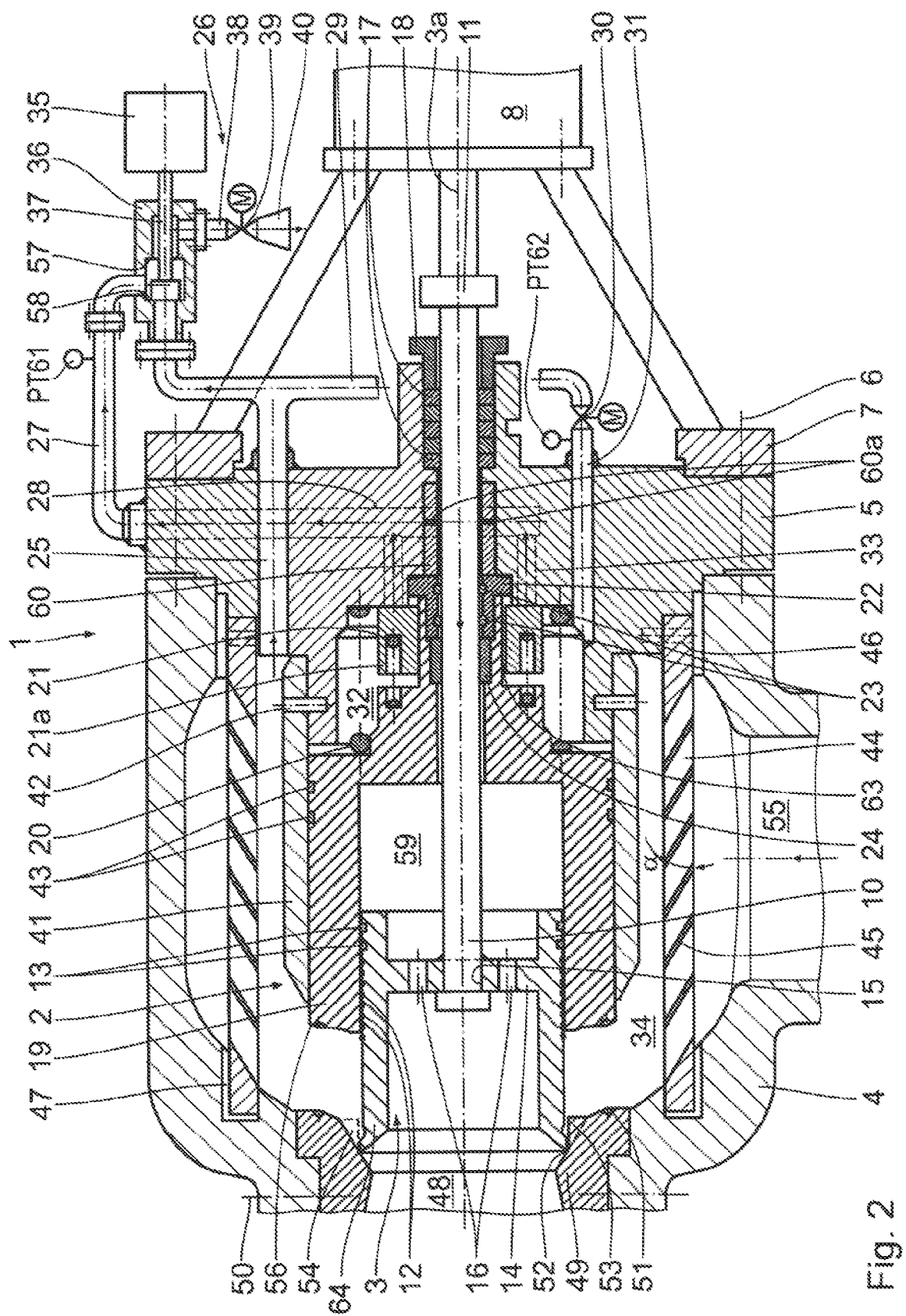

FIG. 2 shows the combination valve 1 with the regulating valve 3 closed and the quick-closing valve 2 open. For this, the valve body 37 of the control valve 26 travels from a first end position 57 to a second end position 58. The valve body 37 thus seals the main steam channel 25 and releases the channel 38, which for the time being, however, is still closed towards the leakage steam line 40 by the shut-off valve 39. The shut-off valve 39 is slowly opened via a ramp and the steam from the spring chamber 32 can escape through the bores 33, the chamber 28, the control line 27, the 3/2 way valve 36 and the channel 38 via the leakage steam line 40.

The quick-closing valve 2 is slightly lifted by the steam pressure present at the control edge 56 of the quick-closing valve 2 and, as soon as the complete front side of the quick-closing valve body 19 is exposed to pressure, it travels backwards into the spring chamber 32 and is opened. The quick-closing valve 2 travels backwards until the spring sleeve 21a, supported by the spring force of the cylindrical compression spring 21, covers the bores 33 and thus interrupts the steam flow to the leakage steam line 40.

The quick-closing valve 2 has now reached the damping zone, and the pressure trapped in the spring chamber 32 then only slowly decreases via the gap until the tensioner 22 rests with its contact diameter $D_k$ on the sleeve 60 and seals the spring chamber 32. The opening process of the quick-closing valve is now complete and is confirmed by pressure measurements PT61 in the control line 27 and PT62 in the spring chamber 32, both of which indicate ambient pressure.

The regulating valve 3 further preventing main steam from entering the steam exhaust port 48 via the second sealing area 52. Depending on the embodiment of the regulating valve 3 and the diffuser 49, the regulating valve 3 seals completely via the second sealing area 52 or allows a certain leakage steam flow.

Figure 3:
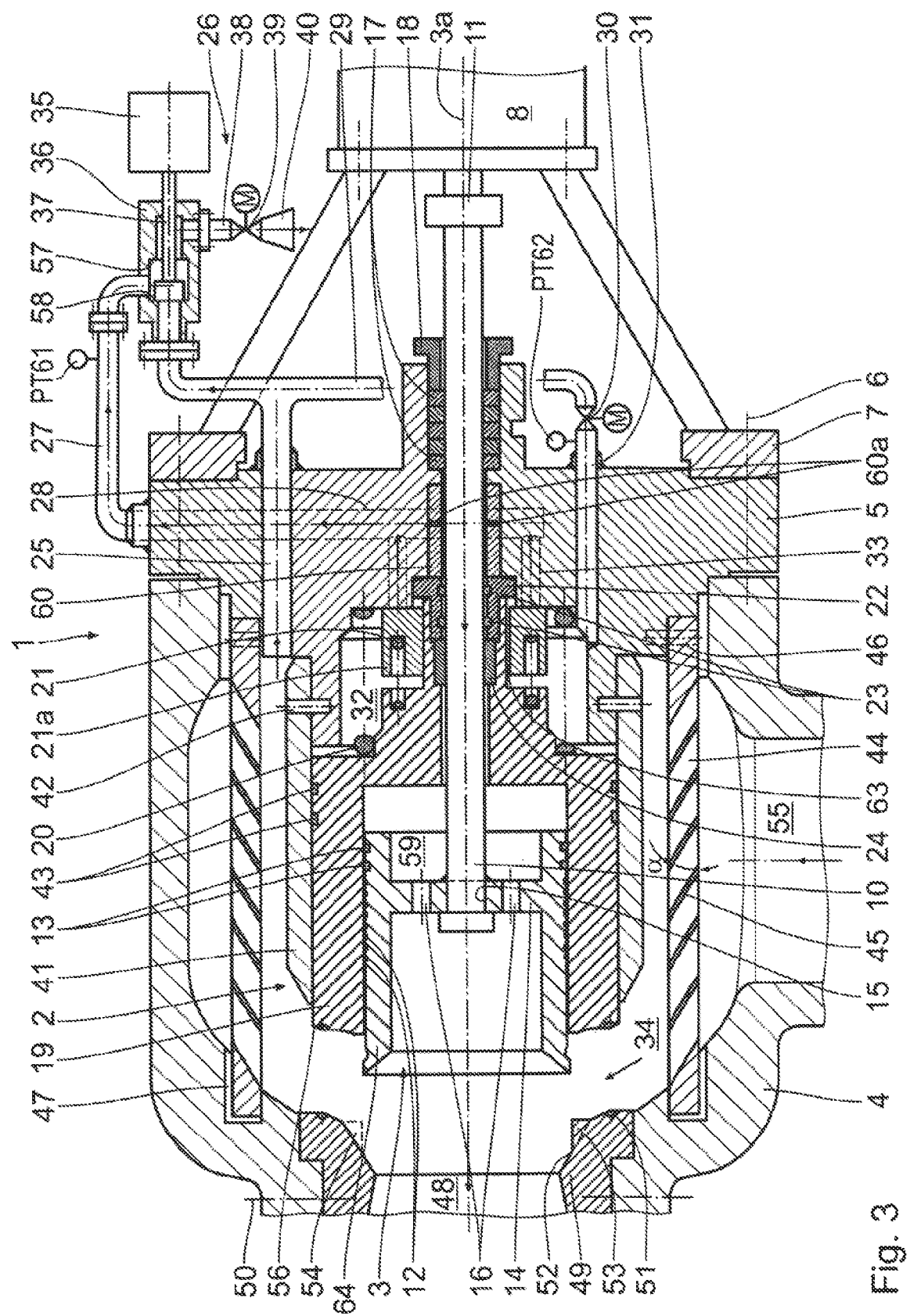

FIG. 3 shows the combination valve with the quick-closing valve 2 open and the regulating valve 3 open. Here, the main steam is directed from the steam entry port 55 through the steam strainer 44. The steam strainer deflection 45 of the steam strainer 44 deflects the steam flow by an angle $\alpha=45°$ in the direction of the steam exhaust port 48.

The steam strainer deflection 45 minimizes the flow losses of the steam flow, which occur when the deflection is too strong. The steam flow flows via the steam chamber 34 in the direction of the steam exhaust port 48. The swirl-breaking teeth 54 of the swirl-breaking device 53 in the diffuser 49 prevent turbulences of the steam flow and thus additionally reduce the flow losses of the steam. Moreover, the additional guidance of the regulating valve 3 in the swirl-breaking device 53 reduces the vibrations that occur.

The combination valve 1 according to FIG. 3 with opened quick-closing valve 2 and opened regulating valve 3 must completely shut off the steam supply within a very short time, in particular approx. 0.3 s, in order to protect or shut down the turbine. For this purpose, the control drive 35 is deactivated by means of a quick-closing command and the valve body 37 travels from its second end position 58 to the first end position 57, as shown in FIG. 1. As a result, the valve body 37 seals the channel 38 and releases the main steam channel 25 so that the steam enters the control line 27 and the chamber 28 via the 3/2 way valve 36 until it reaches the bores 33.

Since the spring chamber 32 is first pressure less, the steam force present in the bores 33 shifts the spring sleeve 21a in the closing direction against the considerably smaller spring force of the cylindrical compression spring 21, thereby opening the inflow into the spring chamber 32. At the same time, the entire back side of the quick-closing valve body 19 is exposed to pressure up to the contact diameter of the tensioner 22 on the sleeve 60.

The steam impulse force and steam pressure force acting on the back side of the quick-closing valve body 19, together with the mechanical closing force of the cylindrical compression spring 20, cause the tensioner 22 to lift off the sleeve 60, as a result of which the steam pressures on the front side and the back side of the quick-closing valve body 19 are now equalized, so that the quick closing operation on the quick-closing valve 2 is effected by shifting along the longitudinal axis 3a. The quick-closing valve 2 has now returned to its initial position as shown in FIG. 1, seals via the sealing area 51 on the diffuser 49 and shuts off the further steam inflow to the turbine. The closing operation is complete and is confirmed by the two pressure measurements PT61 and PT62, both of which indicate the steam pressure in the steam entry port 55.

The regulating valve 3, as a redundant version as to the quick-closing valve 2, also receives the quick-closing command, and the drive 8, via the stem coupling 11 and the stem shaft 10, shifts the regulating valve 3 along the longitudinal axis 3a until it is closed and seals the diffuser 49 via the sealing area 52 so that any steam inflow to the turbine is safely prevented. Since both valves, the quick-closing valve 2 and the regulating valve 3, are now closed, the initial position according to FIG. 1 is reached.

Figure 4:
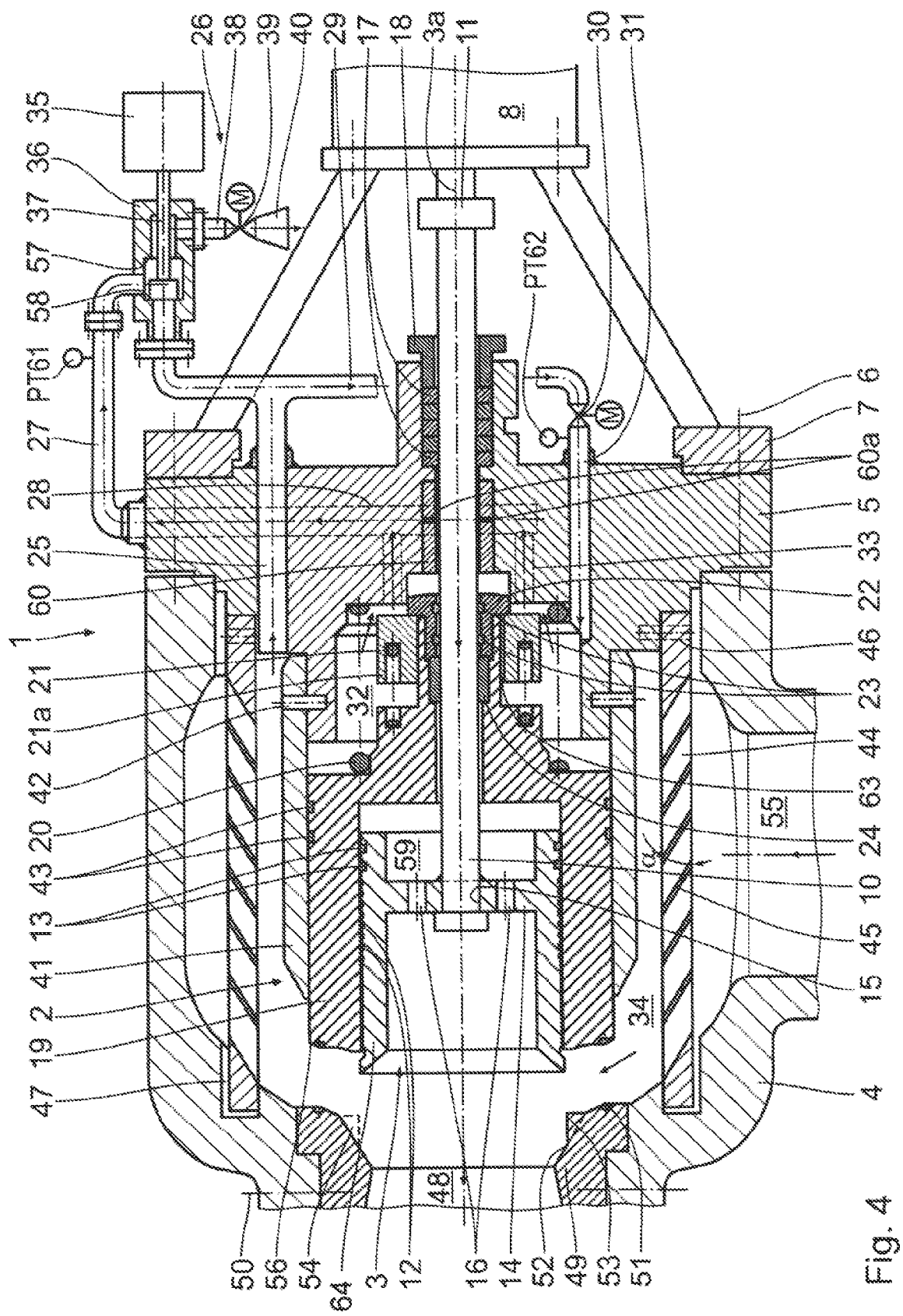

FIG. 4 shows the combination valve 1 with the regulating valve 3 and quick-closing valve 2 open in the partial stroke test. For the partial stroke test, the shut-off valve 30 is slowly opened via a ramp during ongoing operation, i.e. with the regulating valve 3 open. Starting from the position shown in FIG. 3, the main steam and the main steam pressure can now reach the spring chamber 32 via the main steam channel 25, the shut-off line 29, the shut-off valve 30 and the bore 31 and further via the axial groove 63 of the spring sleeve 21a to the contact diameter $D_k$ of the tensioner 22, which rests on the sleeve 60, with the result that the opened quick-closing valve 2, due to the main steam pressure acting on the back side, altogether has a force component in the closing direction. Together with the spring forces of the mechanical closing components 20 and 21 acting in the closing direction of the quick-closing valve, the quick-closing valve 2 overcomes the steam pressure forces acting on the complete front side of the quick-closing valve body 19 and can thus leave its position towards the closing direction. The mechanical closing component 20 is designed not only to overcome the steam pressure force difference between the front side and the back side of the quick-closing valve body 19, but also to have a sufficient closing force of approximately three times the mass of the quick-closing valve body 19.

The steam present up to the contact diameter $D_k$ of the tensioner 22, supported by the closing force of the mechanical closing components 20 and 21, thus displaces the quick-closing valve 2 in the longitudinal axis 3a in the direction of the closed position thereof. This lifts the tensioner 22 off the sleeve 60. The spring sleeve 21a, supported by the spring force of the cylindrical compression spring 21, first continues to seal the bores 33, and via the axial groove 63 the tensioner 22 is now also completely exposed to pressure.

After a defined and adjustable stroke, the tensioner 22 strikes against the spring sleeve 21a and shifts it coaxially to the longitudinal axis 3a. This means that the bores 33 are no longer covered by the spring sleeve 21a, so that the steam can escape through the bores 33, the chamber 28, the control line 27, the 3/2 way valve 36 and the channel 38 into the leakage steam line 40. This creates a balance of forces and a static pressure in the spring chamber 32, which displaces the quick-closing valve into the partial stroke test position of about 15% to 20% of the full stroke and holds it there.

The successful partial stroke test is checked and confirmed via the two pressure transmitters PT61 and PT62 arranged upstream and downstream of the throttle point, respectively, by the pressure displayed in each case levelling off at a common mean pressure somewhere between the steam pressure in the steam entry port 55 and the ambient pressure. Then, the shut-off valve 30 is closed again. The pressure from the spring chamber 32 then decreases via the bores 33, the chamber 28, the control line 27, the 3/2 way valve 36 and the channel 38 into the leakage steam line 40. At the same time, the steam pressure on the complete front side of the quick-closing valve body 19 shifts the quick-closing valve 2 backwards into the spring chamber 32 until the spring sleeve 21a covers the bores 33 and interrupts the steam flow to the leakage steam line 40.

Just as in the opening process of the quick-closing valve 2, now, here too, the damping zone is reached, and the pressure trapped in the spring chamber 32 then only slowly decreases via the gap until the tensioner 22 rests with its contact diameter $D_k$ on the sleeve 60 and seals the spring chamber 32. The quick-closing valve 2 has now again reached the end position "open".

Figure 5:
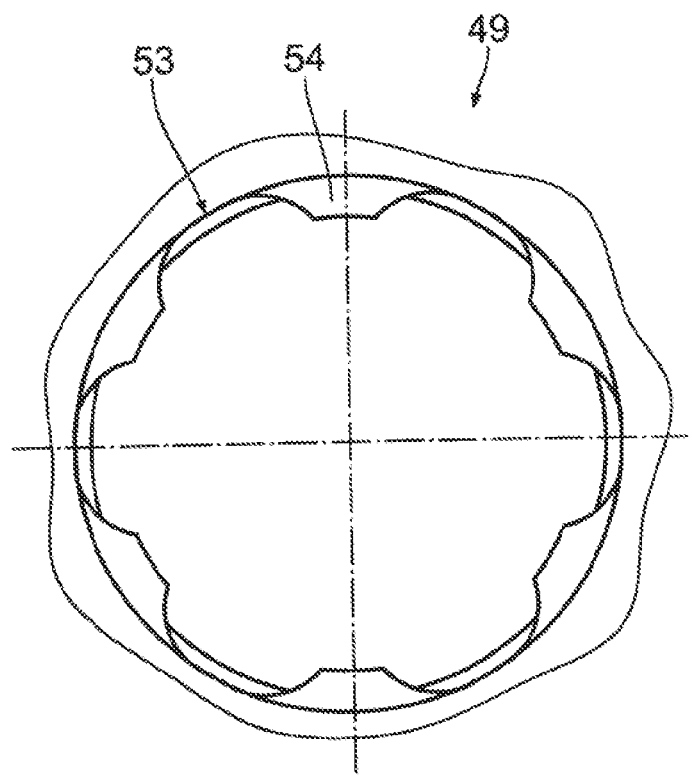

FIG. 5 shows a front view of the diffuser 49. The swirl-breaking teeth 54 here, due to their uniform arrangement and shape, prevent the formation of eddies in the steam flow as the steam enters the diffuser 49. The steam flow here is divided by the swirl-breaking teeth 54 at the border of the diffuser 49. These divided streams thus cannot form large steam eddies and rejoin after the swirl-breaking teeth 54 to form a directed steam flow.

Figure 6:
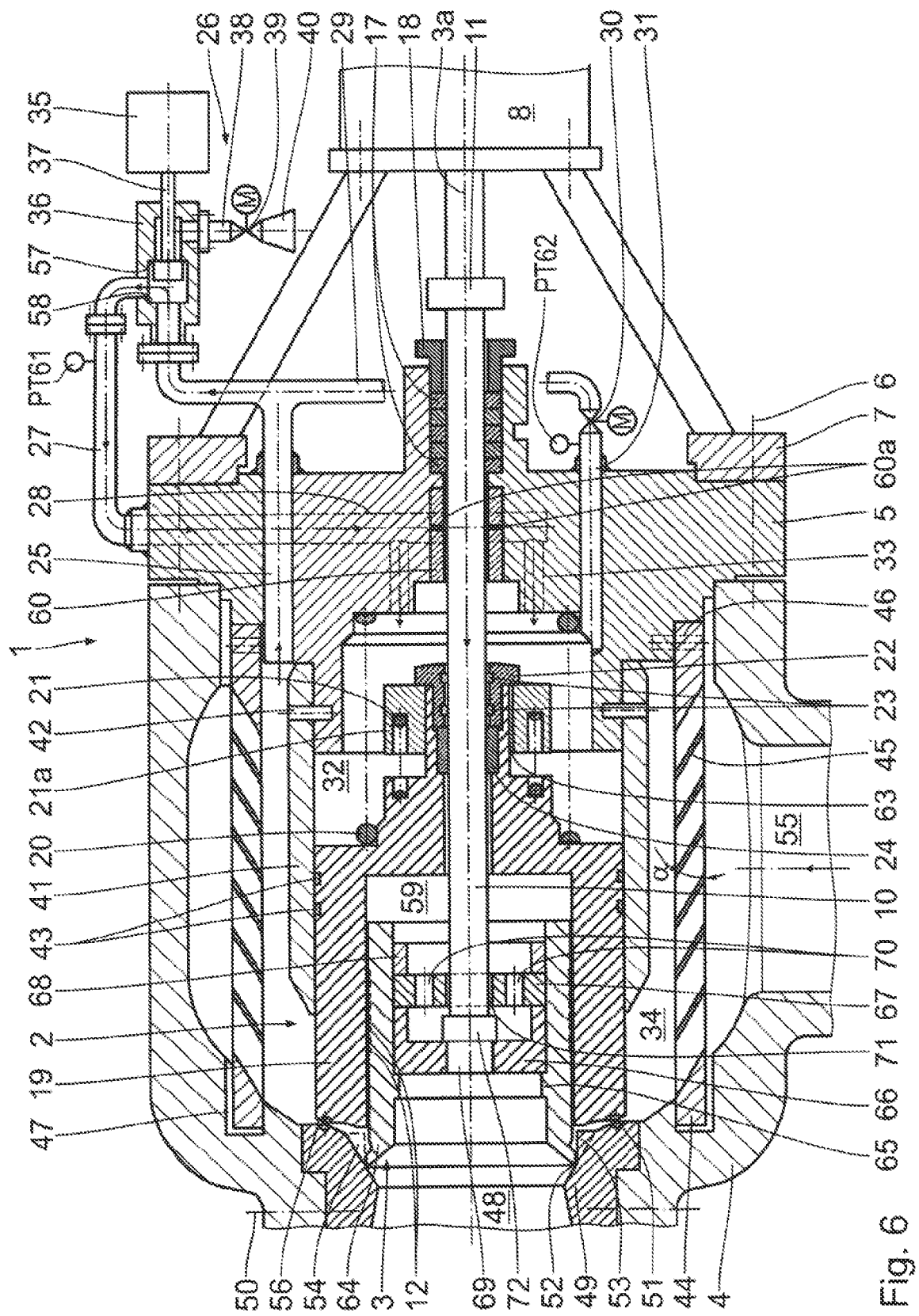

FIG. 6 shows a second embodiment of the combination valve 1. The second embodiment differs with respect to the first embodiment in the design and mode of operation of the regulating valve 3. All other reference signs remain the same in their function and position as in the first embodiment example of FIGS. 1 to 4, except for the sealing rings 13 which have been omitted here. The regulating valve drive 8 and the stem shaft 10 also correspond in their embodiment substantially to the first embodiment example.

In the second embodiment example, the regulating valve 3 is embodied as a pre-stroke regulating valve. Here, the regulating valve 3 comprises a tubular valve body 64 with a step 65 arranged on the inside of the tubular valve body 64, a push body 66, a pull body 67 and a tensioner 68. The push body 66 has a centric bore 69. The pull body 67 has pressure relief bores 70.

The tubular valve body 64 is guided on the inside of the quick-closing valve body 19. The sealing rings 13 are omitted, and as a result the labyrinth seal 12 now allows a small steam flow which reaches the step body 72 and ensures the function thereof. The push body 66 rests inside the tubular valve body 64 against the step 65. The push body 67 rests against the pull body 66. The tensioner 68 rests against the pull body 67 and secures the position of the push body 66 and of the pull body 67. The pull body 67 is guided on the stem shaft 10 via a centric bore 71.

For opening the regulating valve 3, the stem shaft 10 travels backwards via the regulating valve drive 8. Here, the step body 72 of the stem shaft 10, after a short travel distance, rests against the pull body 67 and moves the tubular valve body 64 via the pull body 67 and the tensioner 68.

For closing the regulating valve 3, the stem shaft 10 travels forward by the regulating valve drive 8. Here, the step body 72 of the stem shaft 10, after a short travel distance, rests against the push body 66. The stem shaft 10 then moves the tubular valve body 64, by transmitting the force via the push body 66 and the step 65, forward into the closed position. In the closed position, the tubular valve body 64 rests against the second sealing area 52 of the diffuser 49.

Since such pre-stroke regulating valves have already existed since the 1960s and are described for example in Traupel, W.: "Thermische Turbomaschinen", Springer-Verlag, 1982, and are known to the person skilled in the art, a detailed explanation will be dispensed with at this point. It should be clear, however, that this also applies to such pre-stroke regulating valves which have a different structure than the regulating valve shown in FIG. 6.

Figure 7:
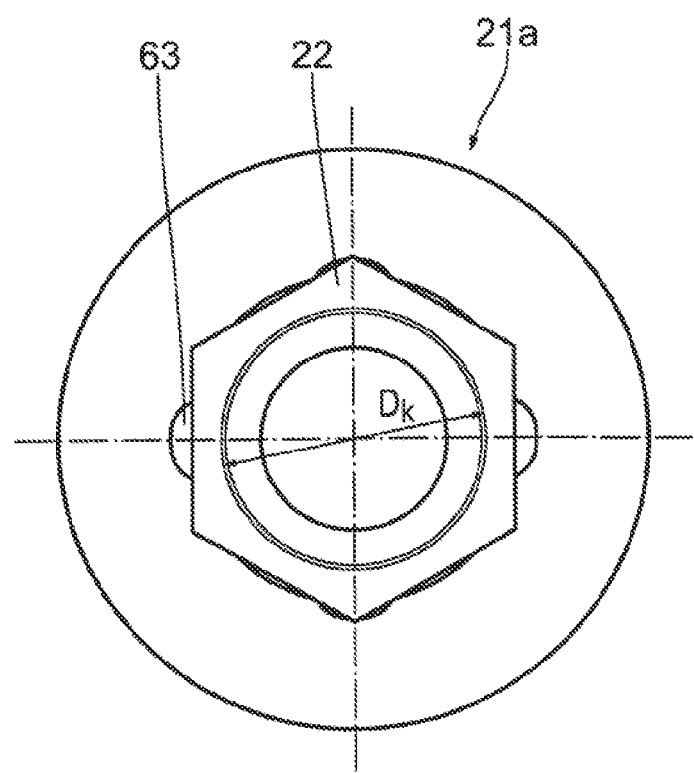

FIG. 7 shows a side view of the spring sleeve 21*a* and the tensioner 22. The tensioner 22 is embodied with an external hexagon on one end face. The external hexagon has a flank distance which corresponds to a standardized wrench size. The surface of the external hexagon of the tensioner 22 is bulged. The bulge has a preferably line-shaped maximum in the contact diameter $D_k$.

The spring sleeve 21*a* has four axial grooves 63. The axial grooves 63 are arranged uniformly at the circumference of the inner bore of the spring sleeve 21*a*. The tensioner 22 is arranged in the inner bore of the spring sleeve 21*a*. The tensioner 22 rests flat against the spring sleeve.

The axial grooves 63 function as flow channels and allow an equalization of pressure when the quick-closing valve is opened and closed. The design of the wrench head of the tensioner 22 as a hexagon and the number of axial grooves ensure here at least one at least partially bare flow channel, due to the geometry of the hexagon and the arrangement of the axial grooves 63 offset by 90° to each other. Pressure differences that cannot be equalized by a flow channel could lead to errors when opening and/or closing the quick-closing valve and thus negatively influence the function of the combination valve.

The invention claimed is:

1. A combination valve for a steam circuit, comprising:
a quick-closing valve, and
a regulating valve,
wherein the quick-closing valve and the regulating valve are arranged in a common housing, the regulating valve is displaceable by an active drive and the quick-closing valve is passively displaceable over a full stroke between an open position and a closed position by steam of the steam circuit,
wherein the combination valve is configured to carry out a partial stroke test on the quick-closing valve when the regulating valve is in an open position during ongoing operation of the steam circuit, wherein the partial stroke test is characterized in that the quick-closing valve is only moved over a part of its full stroke.

2. The combination valve according to claim 1, wherein the quick-closing valve can be exposed to the steam in such a way that it moves in a closing direction,
wherein the combination valve is adapted such that, on account of the movement of the quick-closing valve in the closing direction, a throttle point opens via which the steam can escape, so that the quick-closing valve is prevented from moving further in the closing direction and remains in a partial stroke position.

3. The combination valve according to claim 2, wherein respectively one pressure transmitter is arranged upstream and downstream of the throttle point.

4. The combination valve according to claim 1, wherein the regulating valve is embodied as a pressure-relieved tubular regulating valve.

5. The combination valve according to claim 1, wherein the regulating valve is embodied as a pre-stroke regulating valve.

6. The combination valve according to claim 1, wherein the quick-closing valve is configured with a sleeve-shaped quick-closing valve body and the regulating valve is configured with a tubular valve body,
wherein the tubular valve body of the regulating valve is guided on the inside of the sleeve-shaped quick-closing valve body.

7. The combination valve according to claim 1, wherein the quick-closing valve and the regulating valve are able to travel independently of each other and the regulating valve in the closed state shuts off a flow of steam through the combination valve.

8. The combination valve according to claim 1, comprising a switchable control valve for switching the quick-closing valve.

9. The combination valve according to claim 8, wherein the control valve is a 3/2 way valve.

10. The combination valve according to claim 8, wherein the control valve has a hydraulically or pneumatically embodied control drive.

11. The combination valve according to claim 1, wherein the regulating valve has a regulating valve drive embodied as a low-pressure hydraulic drive or as an electric drive.

12. The combination valve according to claim 1, wherein the housing is constructed from a housing base body and a housing cover, wherein the housing base body is connectable to the housing cover in a force-fitting and/or form-fitting manner.

13. The combination valve according to claim 1, wherein the housing has a steam strainer at a steam entry port, comprising a steam deflection device by means of which the steam is deflectable by an angle of 10° to 80°.

14. The combination valve according to claim 13, wherein the steam strainer is connected to a housing cover of the housing in a detachable manner.

15. The combination valve according to claim 1, wherein the housing has a diffuser at a steam exhaust port.

16. The combination valve according to claim 15, wherein the diffuser is arranged in a housing base body of the housing in a detachable manner.

17. The combination valve according to claim 15, wherein the diffuser comprises a swirl-breaking device.

18. The combination valve according to claims 17, wherein the swirl-breaking device is configured as a guide for the regulating valve.

19. The combination valve according to claim 1, wherein, during operation of the combination valve, a back side of a quick-closing valve body of the quick-closing valve in an open position of the quick-closing valve is not under steam pressure.

20. The combination valve according to claim 1, wherein the regulating valve has a stem shaft with a stem seal,
   wherein the stem seal is exposed to ambient pressure on one side and is pressure less on an opposite side during operation of the combination valve.

21. A SIL 3 certified safety circuit comprising:
   a combination valve for a steam circuit, the combination valve comprising a quick-closing valve and a regulating valve,
   wherein the quick-closing valve and the regulating valve are arranged in a common housing, the regulating valve is displaceable by an active drive and the quick-closing valve is passively displaceable over a full stroke between an open position and a closed position by steam of the steam circuit,
   wherein the combination valve is configured to carry out a partial stroke test on the quick-closing valve when the regulating valve is in an open position during ongoing operation of the steam circuit, wherein the partial stroke test is characterized in that the quick-closing valve is only moved over a part of its full stroke.

* * * * *